United States Patent
Wood et al.

(10) Patent No.: US 7,530,531 B2
(45) Date of Patent: May 12, 2009

(54) APPARATUS AND METHODS FOR INSTALLING AN AIRCRAFT WINDOW PANEL

(75) Inventors: Jeffrey H Wood, Eureka, MO (US); Terry A Sewell, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 563 days.

(21) Appl. No.: 10/958,080

(22) Filed: Oct. 4, 2004

(65) Prior Publication Data
US 2006/0071127 A1  Apr. 6, 2006

(51) Int. Cl.
*B64C 1/14* (2006.01)
(52) U.S. Cl. ............... 244/129.3; 244/131; 244/119; 52/204.5
(58) Field of Classification Search ............ 244/129.3, 244/129.4, 131, 119; 52/204.5
See application file for complete search history.

(56) References Cited

U.S. PATENT DOCUMENTS

| | | | |
|---|---|---|---|
| 2,358,485 A * | 9/1944 | Warren et al. .......... 52/204.591 |
| 2,784,926 A * | 3/1957 | Bonza et al. ............ 244/129.3 |
| 3,429,530 A | 2/1969 | Hertel | |
| 3,953,630 A | 4/1976 | Roberts et al. | |
| 5,271,581 A * | 12/1993 | Irish ....................... 244/129.3 |
| 5,518,208 A | 5/1996 | Roseburg | |
| 6,105,902 A | 8/2000 | Pettit | |
| 7,118,069 B2 * | 10/2006 | Novak et al. ................ 244/119 |
| 2004/0035979 A1 | 2/2004 | McCoskey, Jr. et al. |
| 2004/0238690 A1 | 12/2004 | Wood et al. |

FOREIGN PATENT DOCUMENTS

| EP | 0597624 A1 | 5/1994 |
| EP | 1481892 A2 | 12/2004 |

OTHER PUBLICATIONS

European Search Report for European Application No. EP 05 07 7258 completed Nov. 29, 2005.
European Search Report for European Application No. 05077259.9 completed Nov. 29, 2005.

* cited by examiner

*Primary Examiner*—J. Woodrow Eldred
(74) *Attorney, Agent, or Firm*—Harness, Dickey & Pierce, P.L.C.

(57) ABSTRACT

A method of installing a window panel in an aircraft. The method includes connecting upper and lower ends of the window panel with upper and lower longerons of the aircraft, and connecting a side end of the window panel with a hoop frame of the aircraft. This method makes it possible to eliminate heavy window support structures and to provide continuous hoop frame support members in an aircraft fuselage.

2 Claims, 11 Drawing Sheets

FIG. 14 ized by reference number 20. The fuselage 20 includes a skin 22. The skin 22 is supported by a plurality of generally horizontally oriented longerons 24 and stringers 28 and a plurality of generally vertically oriented hoop frame support members 32. The longerons 24, stringers 28 and hoop
APPARATUS AND METHODS FOR INSTALLING AN AIRCRAFT WINDOW PANEL

CROSS-REFERENCE TO RELATED APPLICATIONS

This application is related to co-pending U.S. patent application Ser. No. 10/958,078, entitled "Injection-Molded Window Panel and Related Methods" and co-pending U.S. patent application Ser. No. 10/958,079, entitled "Apparatus and Methods For Reinforcing a Structural Panel", both filed on the same date as this application and assigned to the assignee of this application, the disclosures of which are incorporated herein by reference.

FIELD OF THE INVENTION

The present invention relates to window panels in aircraft, and more particularly (but not exclusively) to installing a window panel in an aircraft.

BACKGROUND OF THE INVENTION

Aircraft typically have a cylindrical fuselage supported by horizontal longerons and stringers and by vertical hoop frames. In a commercial aircraft, heavy frame structures are built into the fuselage to provide support for passenger windows. When passenger windows are installed in a commercial aircraft, two acrylic panes typically are installed for each window. An outer, heavier pane is separated by an air gap from an inner, thinner, fail-safe pane. To accommodate the windows and window support structure, sections of every hoop frame intersecting the support structure generally have to be omitted from the fuselage.

SUMMARY OF THE INVENTION

The present invention, in one implementation, is directed to a method of installing a window panel in an aircraft. The method includes connecting upper and lower ends of the window panel with upper and lower longerons of the aircraft, and connecting a side end of the window panel with a hoop frame of the aircraft.

In another implementation, a method of installing a window panel in an aircraft fuselage includes positioning the window panel so that upper and lower edges of the window panel abut two longerons of the fuselage. Two side edges of the window panel are aligned essentially with first and second hoop frames of the fuselage so that the window panel partially covers at least one hoop frame intervening between the first and second hoop frames.

In one configuration, the invention is directed to a splice fitting for use in installing a window panel in an aircraft. The splice fitting includes a base configured for connection with at least one window panel. A blade member extends from the base and is configured for connection with a hoop frame of the aircraft.

In yet another implementation, the invention is directed to a method of installing window panels in an aircraft fuselage. Two side ends of first and second window panels are aligned with each other and with a hoop frame of the fuselage. The side ends are connected with a splice fitting, and the splice fitting is connected with the hoop frame.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers may be used in the drawings to identify similar elements.

Figure 1:
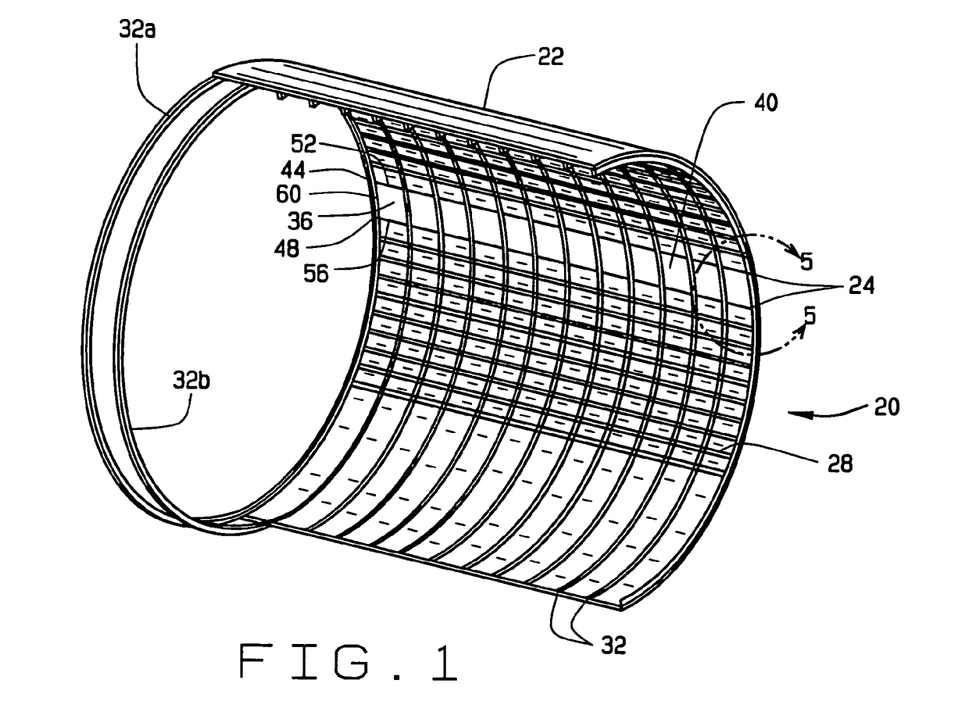
FIG. 1 is an interior perspective view of a portion of an aircraft fuselage cut away to show window panels installed in accordance with one configuration of the present invention.

The present invention, in one implementation, is directed to a method of installing one or more window panels in an aircraft. Referring now to FIG. 1, an aircraft fuselage including window panels installed in accordance with one configuration of the present invention is partially shown and indicated generally by reference number 20. The fuselage 20 includes a skin 22. The skin 22 is supported by a plurality of generally horizontally oriented longerons 24 and stringers 28 and a plurality of generally vertically oriented hoop frame support members 32. The longerons 24, stringers 28 and hoop frame support members 32 provide form and strength to an essentially cylindrical fuselage structure. The hoop frame support members 32 are essentially continuous and essentially circular. Two exemplary hoop frame support members, numbered as 32a and 32b, are shown in their entirety in FIG. 1.

Three window panels 36 installed in the fuselage 20 according to one implementation of the present invention are shown in FIG. 1. Each panel 36 spans four fuselage openings 40, each opening 40 being defined between an upper longeron 44, a lower longeron 48 and adjacent hoop frame support members 32. The window panels 36 could be configured in various ways. For example, in another configuration a window panel could span more than four openings 40 or fewer than four openings. Thus, for example, a window panel could span a single opening 40. Various types of windows and/or window panels may be installed in aircraft using methods and apparatus described herein. Exemplary panel configurations are described in co-pending U.S. patent application Ser. Nos. 10/958,078, 10/958,079 and filed on the same day as and assigned to the assignee of this application, the disclosures of which are incorporated herein by reference in their entirety. It should be noted, however, that other window configurations also could be installed in aircraft using methods and/or apparatus in accordance with principles of the present invention.

Figure 2:
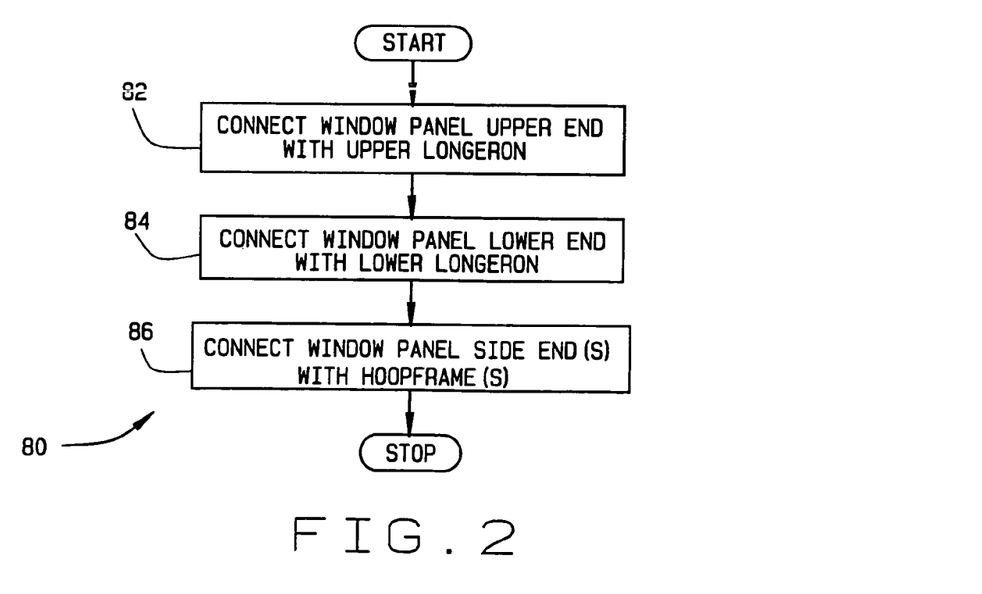
FIG. 2 is a flow diagram of a method of installing a window panel in an aircraft in accordance with one configuration of the present invention.

One implementation of a method of installing a window panel 36 is indicated generally in FIG. 2 by reference number 80. In step 82, an upper end 52 of a window panel 36 is connected with the upper longeron 44. In step 84, a panel lower end 56 is connected with the lower longeron 48. In step 86, at least one side end 60 of the window panel 36 is connected with a hoop frame 32. Such connections could be accomplished in various ways for various window configurations.

Figure 3:
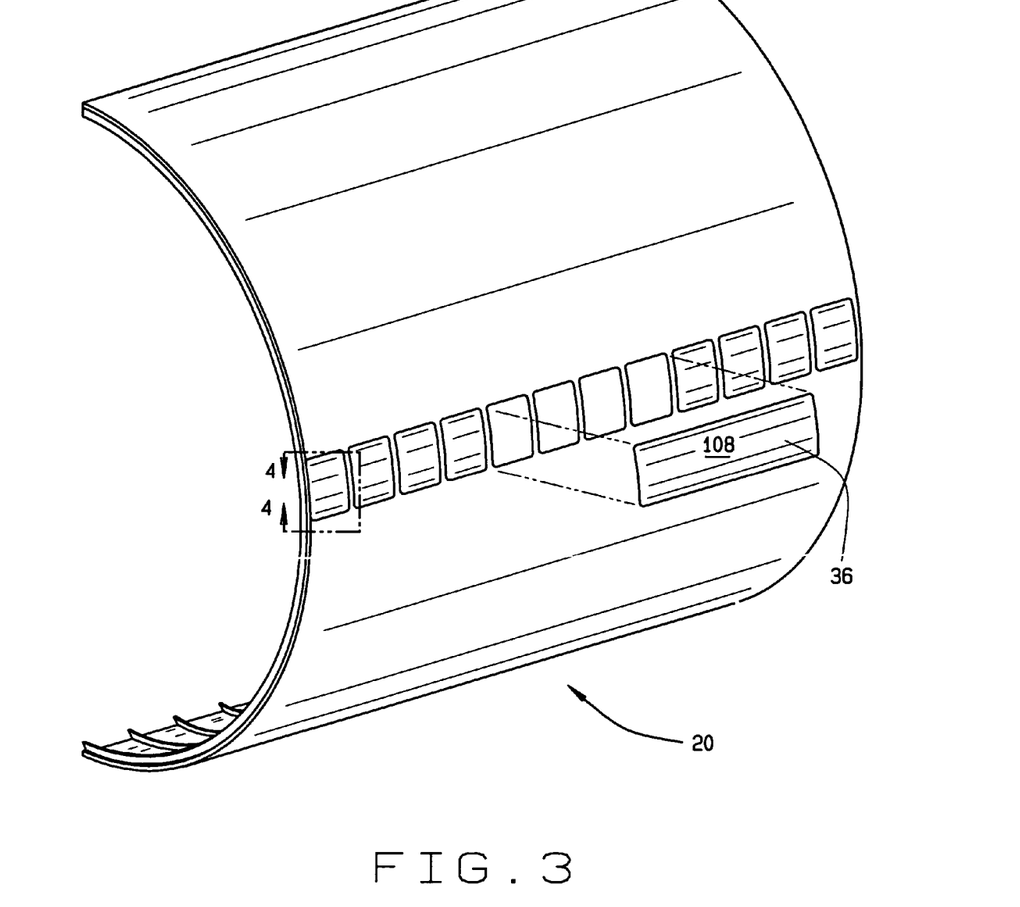
FIG. 3 is an exploded perspective view of a window panel relative to a portion of an aircraft fuselage in accordance with one configuration of the present invention.
Figure 4:
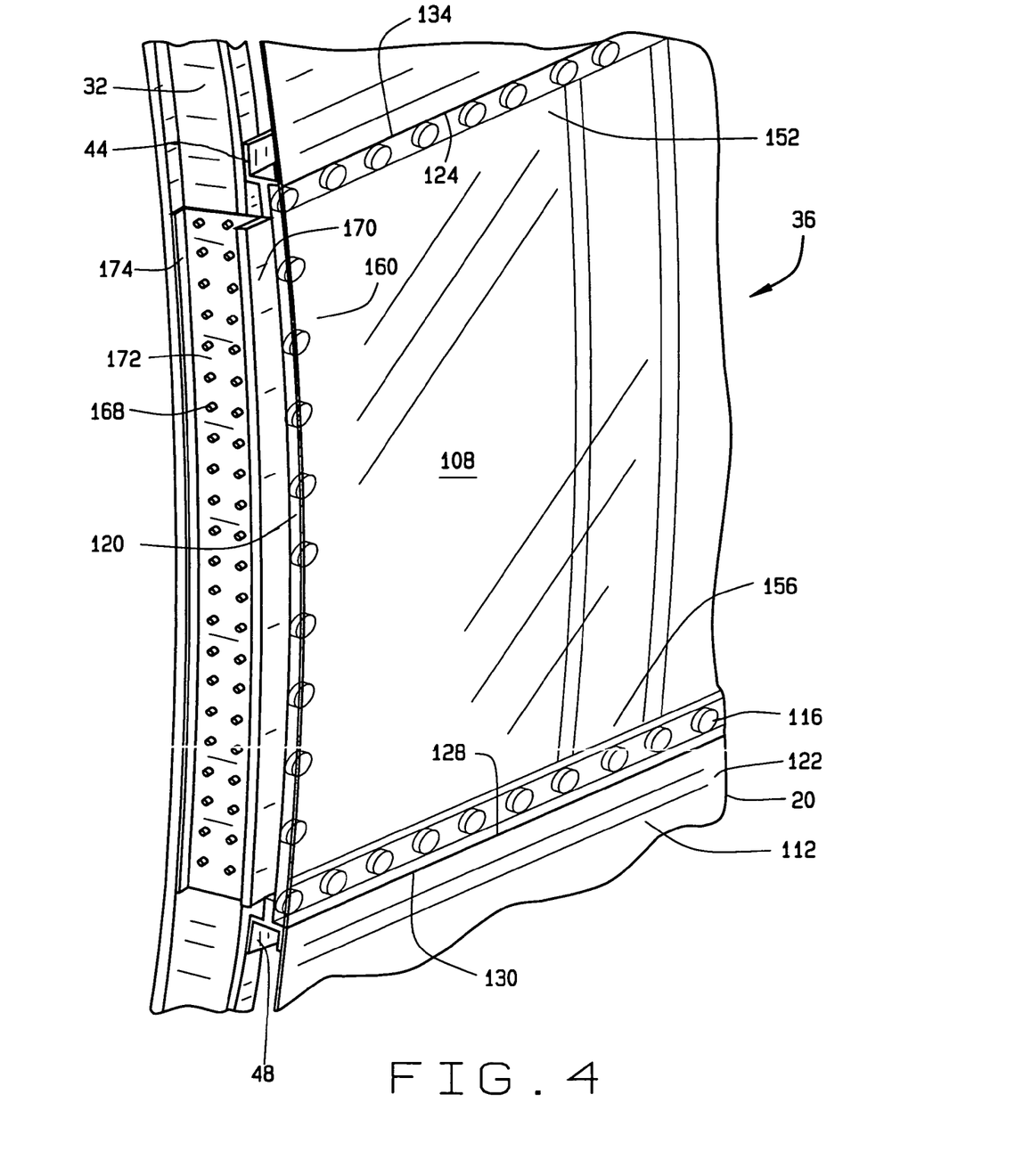
FIG. 4 is a detail on an enlarged scale taken along the lines 4-4 in FIG. 3.

One implementation of the foregoing method is shown in FIGS. 3-8. Referring to FIG. 3, a panel 36 includes a single piece of generally transparent injection-molded material 108. A window panel 36 has a curvature that follows one or more mold lines of the fuselage 20. Thus, as can be seen in FIG. 4, the window panel 36 has a convex curvature that generally continues a convex curvature of the fuselage 20. In other implementations, however, a window panel could include curved and/or flat portions that differ in curvature and/or flatness from a structure relative to which such panel is installed.

Referring now to FIGS. 4-8, a panel 36 may be reversibly installed relative to an exterior side 112 of the fuselage 20. A plurality of metal panel attachment inserts 116 are embedded in the panel 36 alongside one or more panel edges, e.g., alongside one or both of two side edge(s) 120 (one of which is shown in FIG. 4), alongside an upper edge 124, and/or alongside a lower edge 128. The attachment inserts 116 may be used to connect the panel 36 with the fuselage 20 as further described below.

An upper end 152 of the panel 36 is attached via inserts 116 to the upper longeron 44 of the aircraft. The upper edge 124 of the panel generally meets an edge 134 of the skin 22 of the aircraft. A lower end 156 of the panel is attached via inserts 116 to the lower longeron 48. The lower edge 128 of the panel generally meets an edge 130 of the skin 22. In another configuration not shown, one or more ends of the panel 36 may be lap-spliced to the skin 22.

At least one side end 160 of the panel 36 may be attached relative to an aircraft hoop frame support member 32 via inserts 116 and a window panel splice fitting 168. The panel 36 may partially covers, but is not necessarily attached to, an intervening hoop frame support member 32 visible in FIG. 4 through the panel 36. An "intervening" support member 32 is one that lies between side ends 160 of the panel 36 once the panel 36 is aligned with one or more hoop frames 32 for installation.

The splice fitting 168 includes a base 170 and a blade member 172 having an edge 174 contoured to nest in a hoop frame 32 when the panel 36 is installed. It should be noted that other shapes and configurations of splice fittings are possible for use in installing other structural panel configurations. For example, a splice fitting could have a shape (including but not limited to a curved shape) to match the shape of a structural element with which the splice fitting is configured for connection.

Figure 5:
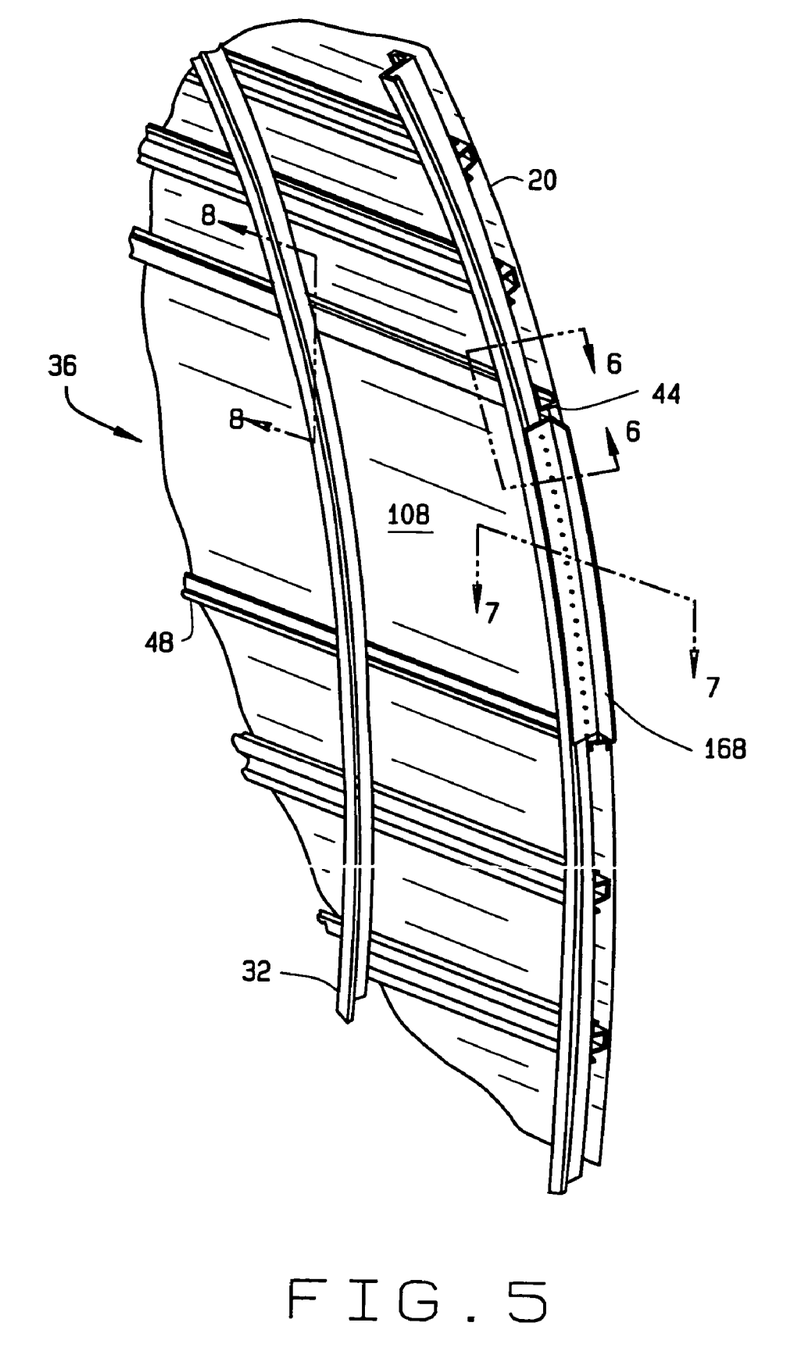
FIG. 5 is a detail on an enlarged scale taken along the lines 5-5 in FIG. 1.
Figure 6:
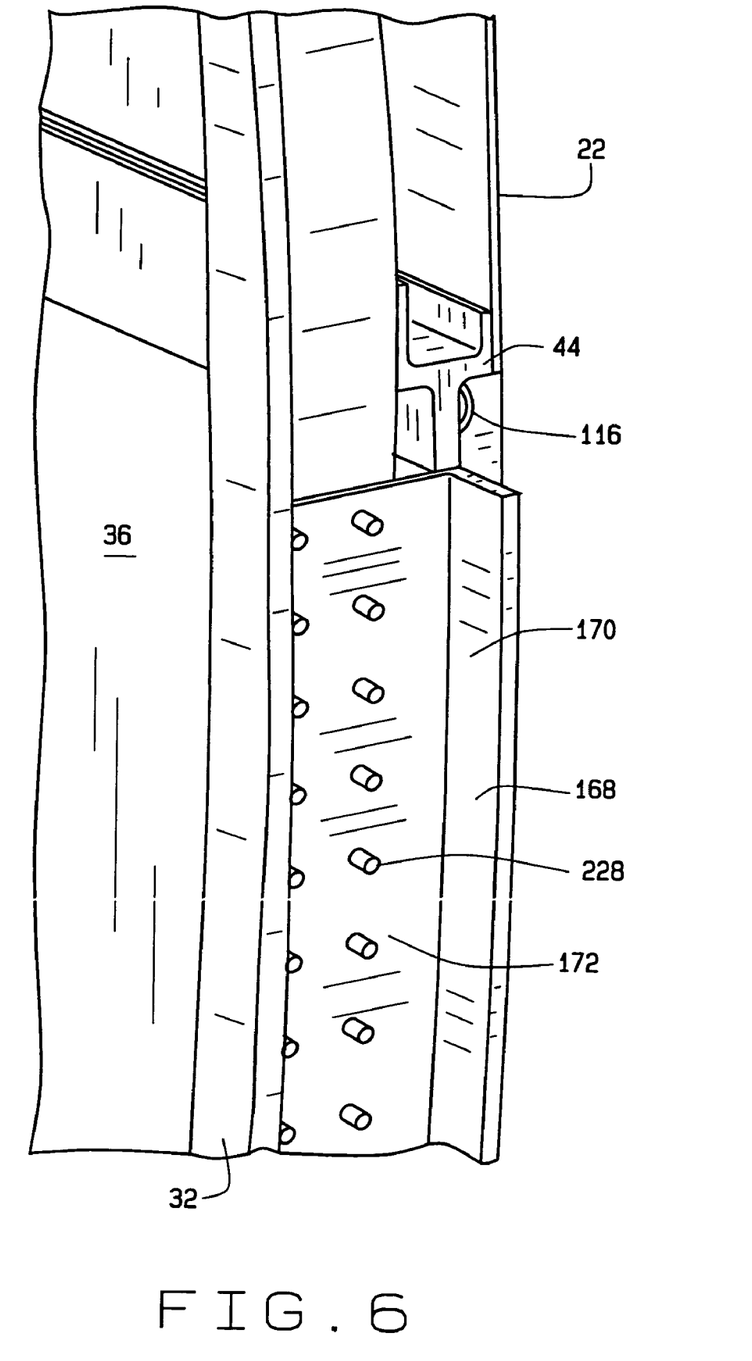
FIG. 6 is a detail on an enlarged scale taken along the lines 6-6 in FIG. 5.

FIG. 5 is a detail on an enlarged scale taken along the lines 5-5 in FIG. 1. FIG. 6 is a detail on an enlarged scale taken along the lines 6-6 in FIG. 5.

Figure 7:
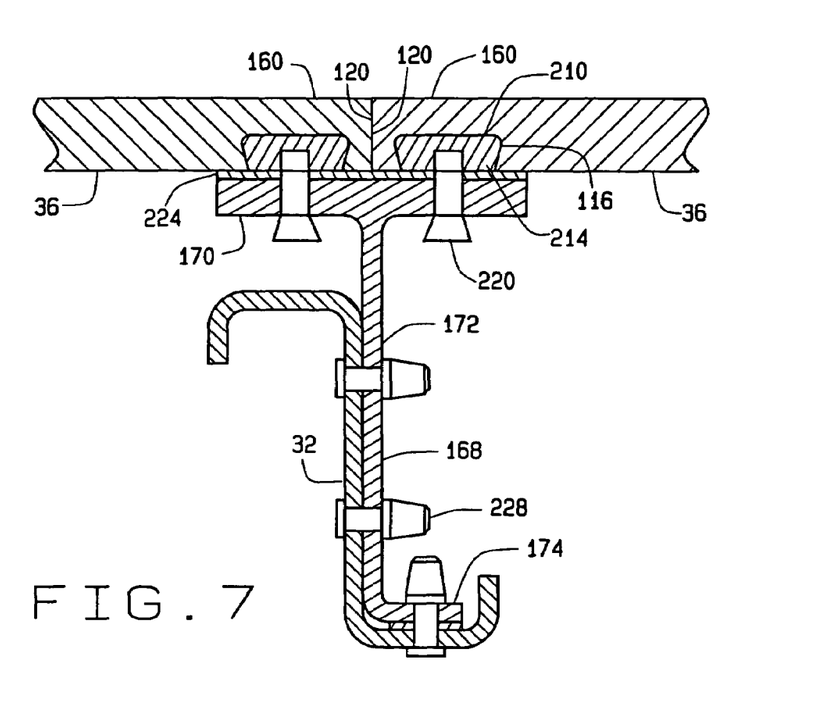
FIG. 7 is a sectional view, taken along the plane of line 7-7 in FIG. 5, of two window panel ends mounted relative to an aircraft support member in accordance with one configuration of the present invention.

FIG. 7 is a sectional view, taken along the plane of line 7-7 in FIG. 5, of two window panel side ends 160 mounted relative to a hoop frame support member 32 in accordance with one configuration of the present invention. In the present configuration, each attachment insert 116 has a tapered shape, thereby providing a distal end 210 that is wider than a proximal end 214 of the insert. The proximal end 214 is positioned in the panel 36 to receive a fastener 220 for attaching the panel 36 to the splice fitting 168.

The side ends 160 of two panels 36 are aligned with each other and with the hoop frame 32. The side ends 160 may be mounted such that side edges 120 of the panels 36 are essentially in contact with each other. A seal 224 is applied to the panel side ends 160 over the attachment inserts 116, and a window panel splice fitting 168 is placed over the seal. Alternatively, the seal 224 could be applied to the window panel splice fitting 168, and the splice fitting 168 could be placed over the attachment inserts 116. Fasteners 220 are installed through the splice fitting 168 and seal 224 and into the attachment inserts 116. The splice fitting 168 may be fastened to the support member 32 using fasteners 228.

Figure 8:
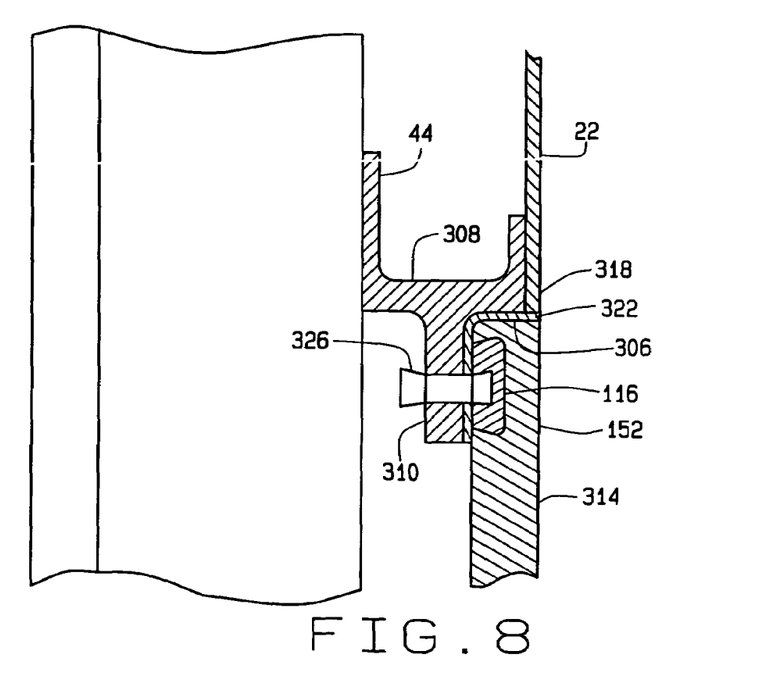
FIG. 8 is a sectional view, taken along the plane of line 8-8 in FIG. 5, of a window panel upper end mounted relative to an aircraft longeron in accordance with one configuration of the present invention.

FIG. 8 is a partial sectional view of the fuselage 20, taken along the plane of line 8-8 in FIG. 5. The window panel upper end 152 is mounted relative to the upper longeron 44 in accordance with one configuration of the present invention. The panel upper end 152 is placed in a recess 306 between a base 308 and spine 310 of the longeron 44 such that an outer surface 314 of the panel end 152 is generally continuous with an outer surface 318 of the skin 22. An attachment insert 116 embedded in the panel end 152 is aligned with the spine 310 of the longeron 44.

When the window panel upper end 152 is mounted relative to the longeron 44, a seal 322 is applied between the longeron 44 and panel upper end 152, and the upper end 152 is positioned in the recess 306. The seal 322 may be, for example, fabricated of neoprene or silicone rubber. A fastener 326 is installed through the longeron spine 310 and seal 322 and into the attachment insert 116. The lower end 156 of the panel may be placed in a recess between a base and spine of the lower longeron 48 and may be connected with the lower longeron 48 in the same or a similar manner as described with reference to the upper end 152.

Figure 9:
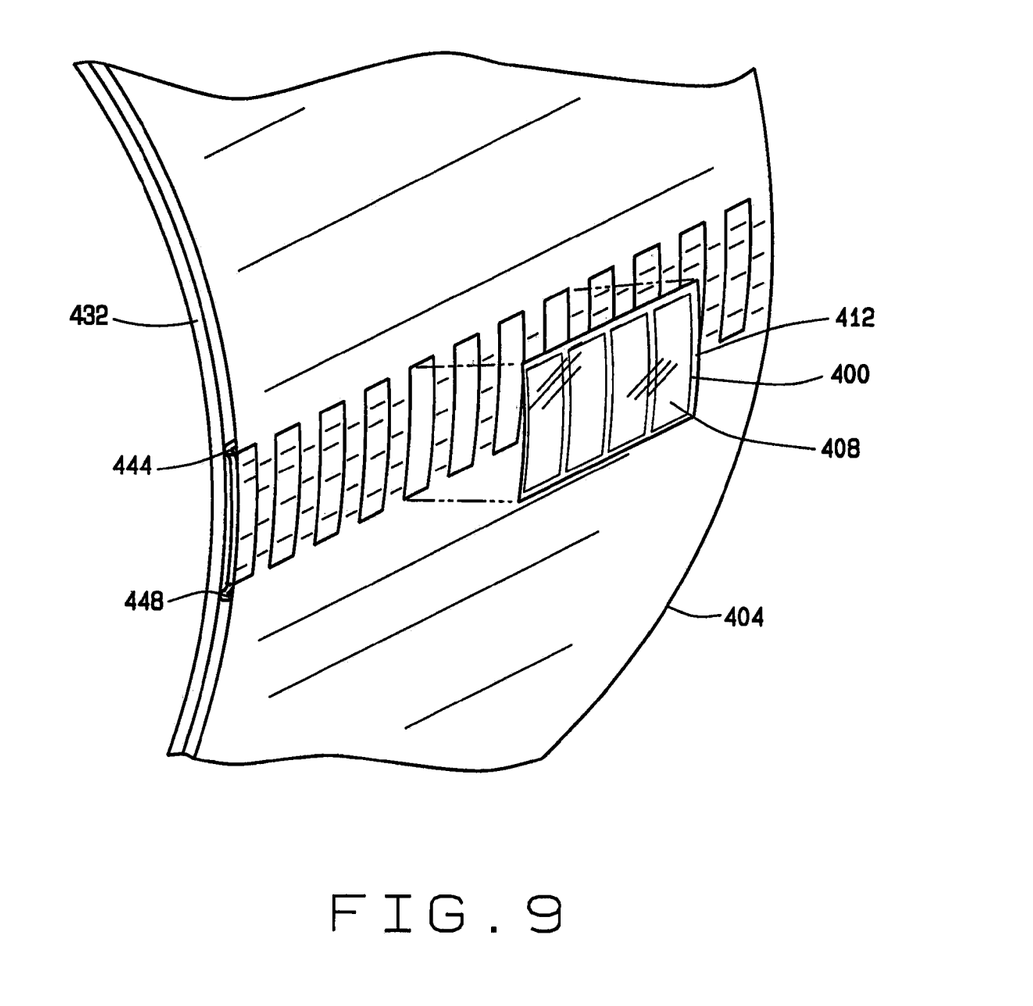
FIG. 9 is an exploded perspective view of a window panel relative to a portion of an aircraft fuselage in accordance with one configuration of the present invention.
Figure 10:
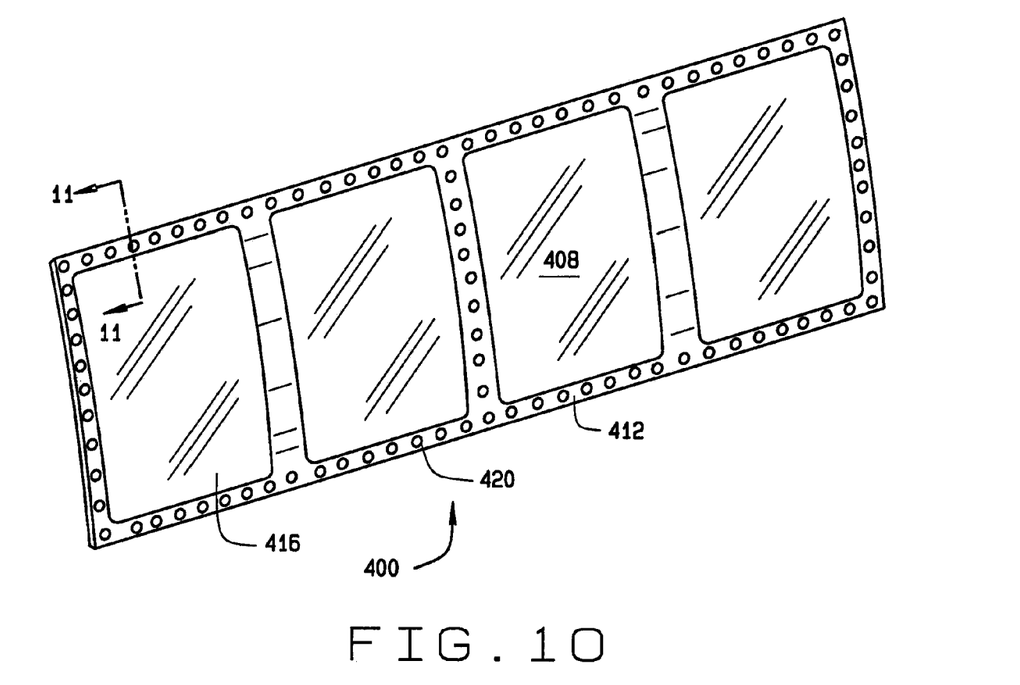
FIG. 10 is a perspective view of a window panel that may be installed in an aircraft in accordance with one configuration of the present invention.
Figure 11:
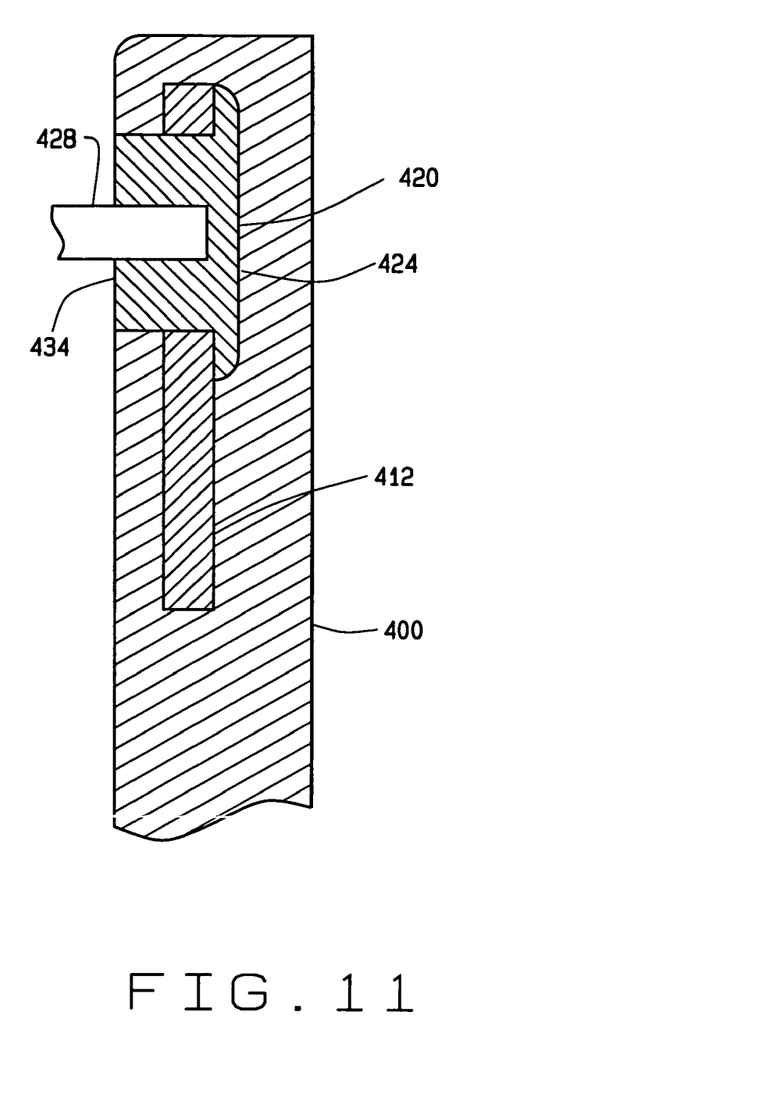
FIG. 11 is a sectional view, taken along the plane of line 11-11 in FIG. 10, of part of a window panel that may be installed in an aircraft in accordance with one configuration of the present invention.

Another configuration of a window panel that can be installed in accordance with implementations of the present invention is indicated generally in FIGS. 9-11 by reference number 400. The panel 400 is shown relative to an aircraft fuselage 404 in FIG. 9 and includes a single piece of generally transparent injection-molded material 408. The panel 400 also includes a frame 412 fabricated, for example, of a composite material. The frame 412 defines one or more windows, e.g., four windows 416 as shown in FIG. 8. The panel 400 includes a plurality of framework attachment members, for example, a plurality of framework attachment inserts 420. The inserts 420 are supported by the frame 412 and are at least partially embedded in the material 408 for attaching the panel 400 relative to the fuselage 404.

An insert 420 is shown in greater detail in FIG. 11. A head 424 of the insert 420 is supported by the frame 412. A fastener 428 (a portion of which is shown in FIG. 11) is inserted into a shaft 434 of the insert 420 to attach the panel 400 to the fuselage 404. Specifically, inserts 420 and fasteners 428 may be used to connect the panel 400 with an upper longeron 444, a lower longeron 448, and one or more hoop frames 432, for example, via one or more splice fittings as previously described with reference to FIGS. 1-8.

Figure 12:
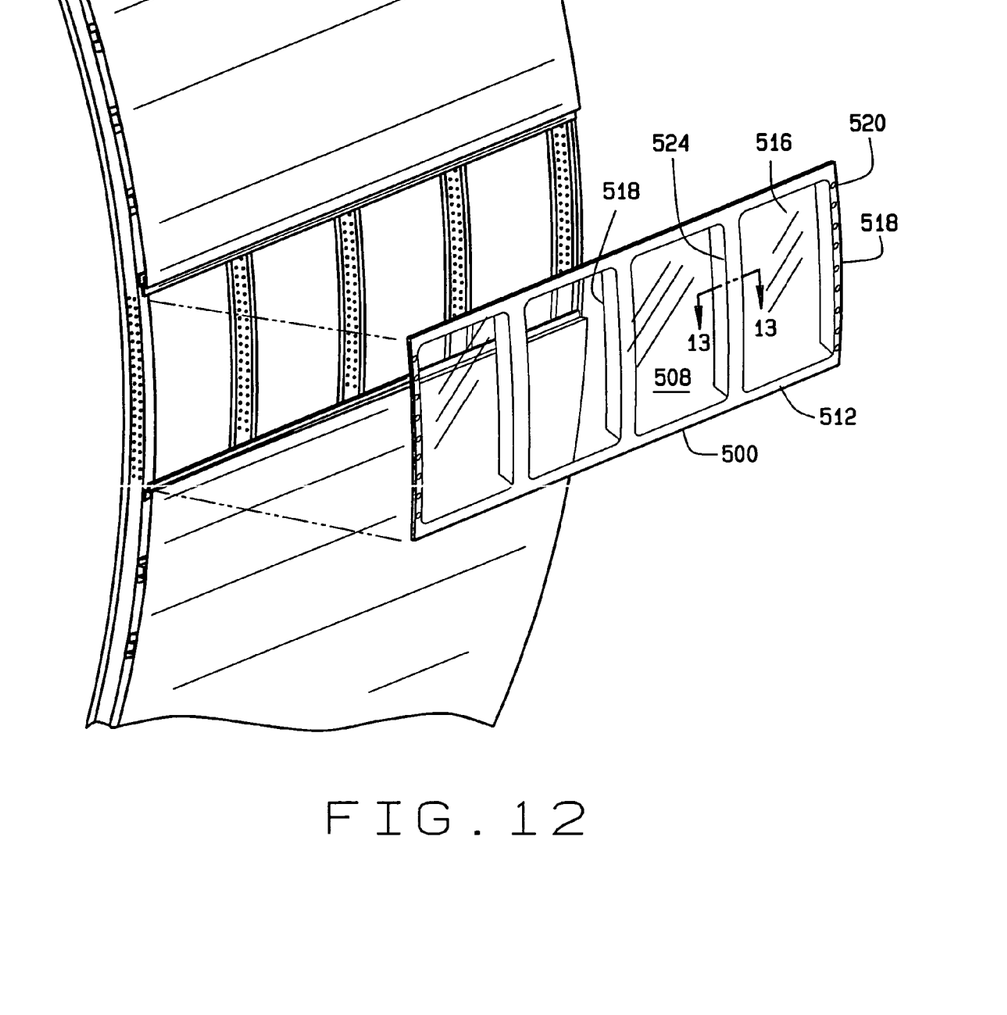
FIG. 12 is an exploded perspective view of a window panel relative to a portion of an aircraft fuselage in accordance with one configuration of the present invention.
Figure 13:
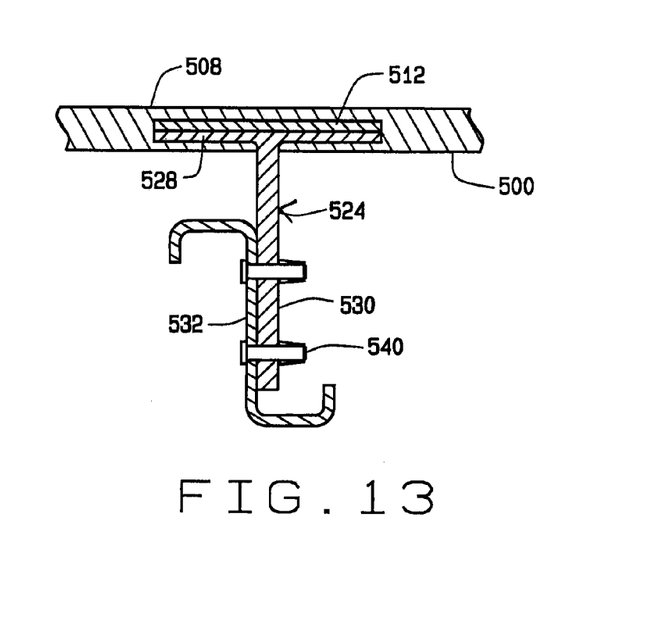
FIG. 13 is a sectional view, taken along the plane of line 13-13 in FIG. 12, of part of a window panel that may be installed in an aircraft in accordance with one configuration of the present invention.
Figure 14:
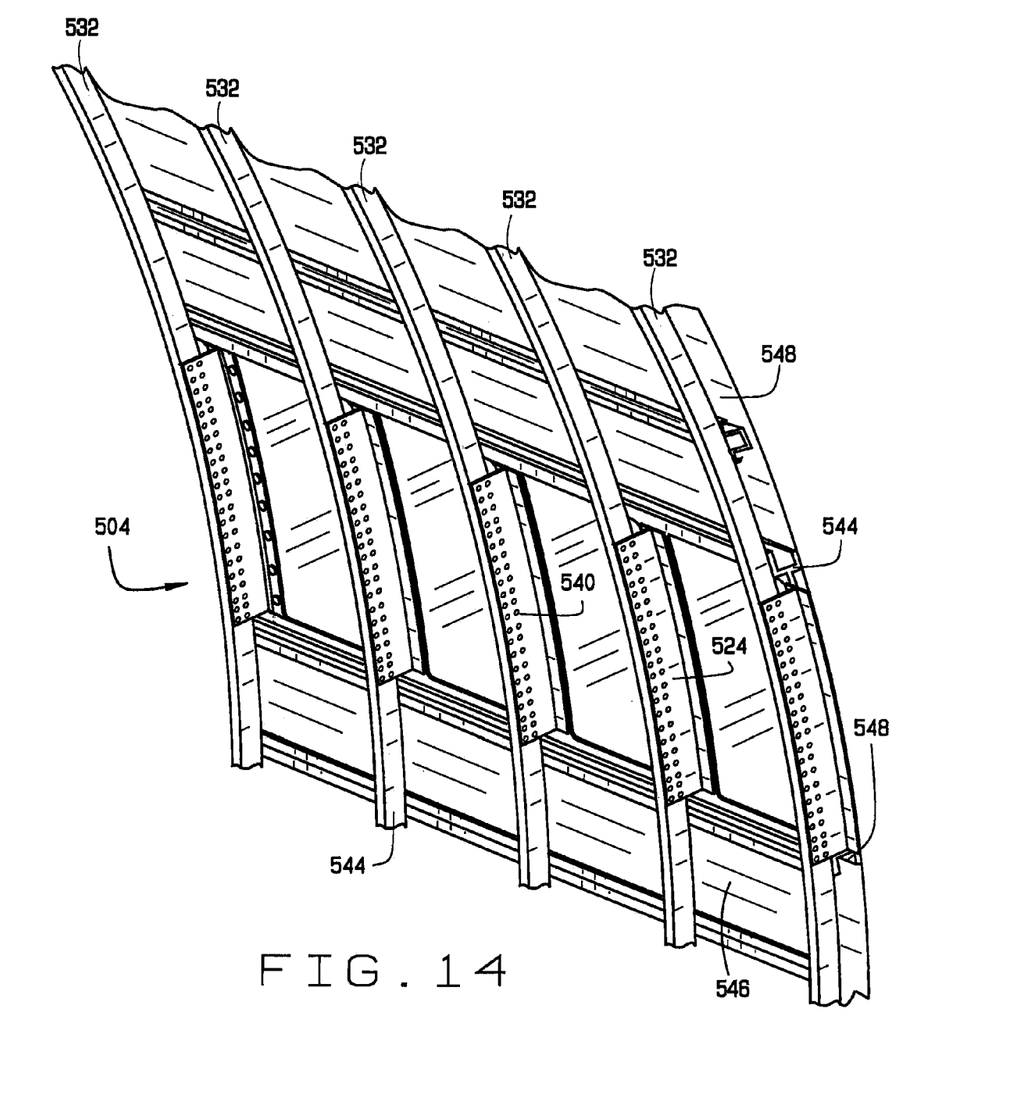
FIG. 14 is an interior perspective view of an aircraft fuselage and window panel installed therein in accordance with one configuration of the present invention.

Another implementation of a method of installing a panel shall now be described with reference to FIGS. 12-14. A window panel is indicated in FIGS. 12-14 by reference number 500. The panel 500 is shown relative to an aircraft fuselage 504 and includes a single piece of generally transparent injection-molded material 508. The panel 500 also includes a frame 512 fabricated, for example, of a composite material. The frame 512 defines one or more windows, e.g., four windows 516 as shown in FIG. 12. The panel 500 includes a plurality of attachment members 518, for example, a plurality of framework attachment inserts 520 and attachment blades 524. The attachment members 518 are supported by the frame 512 and are at least partially embedded in the material 508 for attaching the panel 500 relative to the fuselage 504.

Referring to FIG. 13, an attachment blade 524 includes a base 528 supported by the frame 512 and a blade member 530 extending from the base 528. An attachment blade 524 may be fabricated of a composite material, for example, from a high-modulus carbon fabric combined with a toughened epoxy resin. Additionally or alternatively, an attachment blade 524 may be fabricated of metal, for example, aluminum. The base 528 is embedded with the frame 512 in the material 508. The blade member 530 extends from the embedded base 528 and through the material 508. Fasteners 540 are used to attach the blade member 530 to an aircraft hoop frame support member 532.

FIG. 14 is an interior perspective view of the fuselage 504 and window panel 500. The panel 500 is attached to a plurality of hoop frame support members 532 via a plurality of attachment blades 524 and fasteners 540. The panel 500 is incorporated into a skin 546 of the fuselage 504 and fits between and abuts an upper longeron 544 and lower longeron 548.

The foregoing methods for installing windows make it possible to eliminate the heavy structures used to support current aircraft windows. Incorporating a window panel into an aircraft fuselage as described above makes it possible to have continuous hoop frame members, whereas previously segments of virtually every hoop frame in the fuselage window area would have been absent to allow for inclusion of the window support structure. Fuselage strength thus can be increased. When a window panel is installed, connections between the window panel and fuselage can be made from inside the fuselage. Multiple windows can be installed quickly and simultaneously. Aircraft weight and costs can be reduced, even while fuselage support structures are strengthened.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method of installing a window panel in an aircraft, the method comprising:
    connecting upper and lower ends of the window panel with upper and lower longerons of the aircraft;
    connecting a splice fitting between a side end of the window panel and a hoop frame of the aircraft to connect the side end with the hoop frame; and
    connecting the splice fitting to another window panel.

2. A method of installing a window panel in an aircraft fuselage, the method comprising:
    positioning the window panel so that upper and lower edges of the window panel abut two longerons of the fuselage;
    aligning two side edges of the window panel essentially with first and second hoop frames of the fuselage so that the window panel partially covers at least one hoop frame intervening between the first and second hoop frames;
    connecting the upper and lower ends of the window panel with the longerons;
    connecting a splice fitting between a side end of the window panel and one of the first and second hoop frames to connect the side end with the one of the first and second hoop frames; and
    connecting the splice fitting with an edge of another window panel.

* * * * *